United States Patent
Heckmann et al.

(10) Patent No.: US 6,349,255 B1
(45) Date of Patent: Feb. 19, 2002

(54) METHOD AND DEVICE FOR PRODUCING A SIGNAL REPRESENTING A MOTOR VEHICLE RUNNING CONDITIONS

(75) Inventors: Hans Heckmann; Hermann Winner, both of Karlsruhe (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/423,569

(22) PCT Filed: Mar. 6, 1999

(86) PCT No.: PCT/DE99/00596

§ 371 Date: Mar. 27, 2000

§ 102(e) Date: Mar. 27, 2000

(87) PCT Pub. No.: WO99/46604

PCT Pub. Date: Sep. 16, 1999

(30) Foreign Application Priority Data

Mar. 10, 1998 (DE) .......................... 198 10 213

(51) Int. Cl.$^7$ .............................. B60G 17/15; B60T 8/00
(52) U.S. Cl. ............................. 701/70; 701/38; 701/48; 308/117
(58) Field of Search ................. 701/48, 65, 70, 701/37, 38, 79, 80; 303/177

(56) References Cited

U.S. PATENT DOCUMENTS

| | | | |
|---|---|---|---|
| 5,425,574 A | * | 6/1995 | Sano ........................... 303/97 |
| 5,579,230 A | | 11/1996 | Lin et al. ...................... 701/70 |
| 5,706,196 A | * | 1/1998 | Romstadt ..................... 701/48 |

FOREIGN PATENT DOCUMENTS

| | | |
|---|---|---|
| DE | 33 42 553 | 6/1985 |
| DE | 38 21 281 | 7/1989 |
| DE | 195 27 531 | 1/1996 |
| DE | 196 28 971 | 1/1998 |
| EP | 0 583 988 | 2/1994 |
| JP | 07 012563 | 1/1995 |

OTHER PUBLICATIONS

Mizuno et al. "High Frequency Operation Of Metal–Halide Lamp Controlled By Microcomputer" Journal of Illuminating Engineering Of Japan, vol. 71, No. 10 pp. 622–625 (Oct. 1987).

* cited by examiner

Primary Examiner—William A. Cuchlinski, Jr.
Assistant Examiner—Arthur Donnelly
(74) Attorney, Agent, or Firm—Kenyon & Kenyon

(57) ABSTRACT

A method and an apparatus for generating a driving status signal that represents the driving status of a motor vehicle. A wheel acceleration variable representing the acceleration of the vehicle wheels is formed. In addition, an acceleration variable representing the longitudinal acceleration of the vehicle is sensed by way of sensors. The wheel acceleration variable that is formed is low-pass filtered, and the acceleration variable that is sensed is high-pass filtered. The driving status signal is generated as a function of an association between the low-pass-filtered wheel acceleration variable and the high-pass-filtered acceleration variable. As a result, it possible to determine the vehicle's ground acceleration from a combination of the signals of an acceleration sensor and the wheel rotation speed signals.

10 Claims, 1 Drawing Sheet

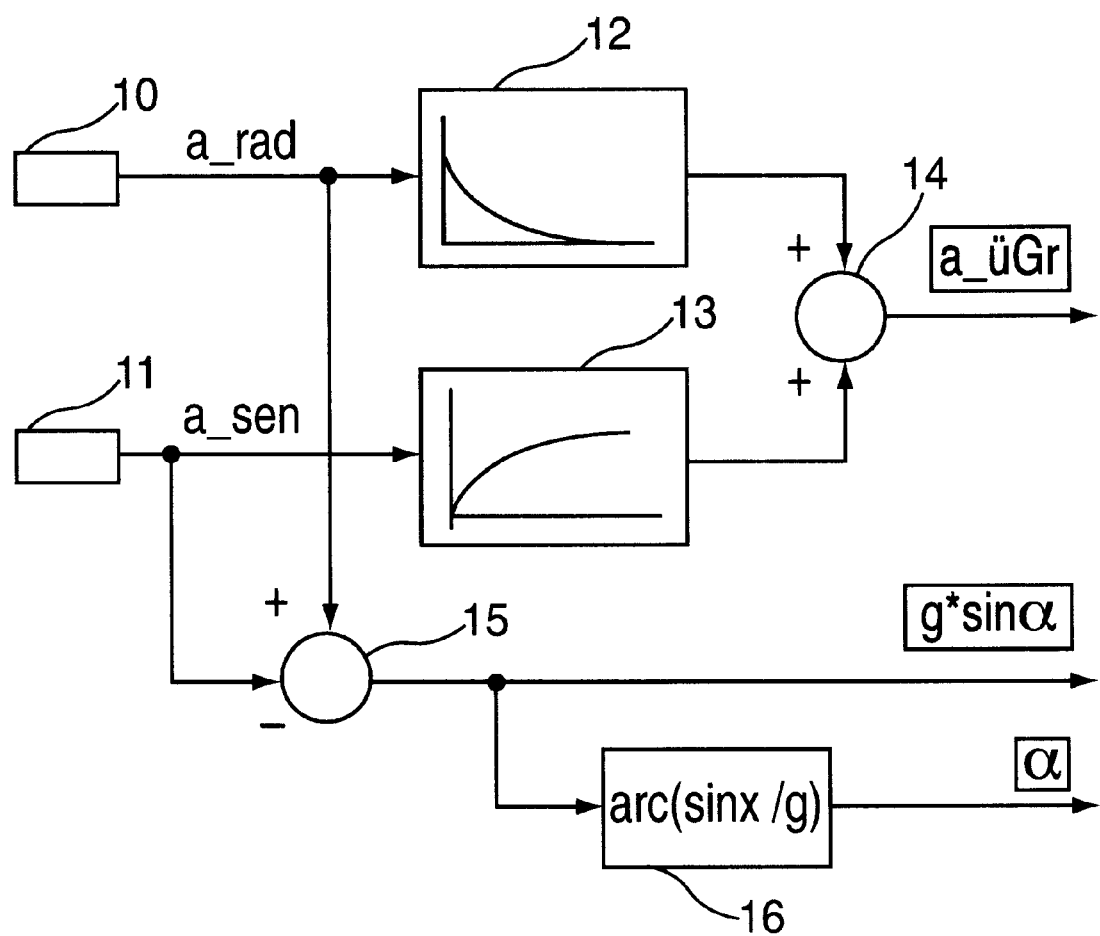

METHOD AND DEVICE FOR PRODUCING A SIGNAL REPRESENTING A MOTOR VEHICLE RUNNING CONDITIONS

BACKGROUND INFORMATION

The present invention relates to a method and an apparatus for generating a driving status signal in a motor vehicle.

Data that represent the acceleration of the vehicle relative to the road surface, i.e. the ground acceleration, are required, for example, in a spacing and speed control system in lines of vehicles. In such a system, the deceleration with which the vehicle must be braked in order to keep the spacing constant is calculated as a function of the vehicle speed and its spacing from the vehicle in front.

The ground acceleration, as well as the forces caused by a road surface inclined in the longitudinal direction, are also used in the braking control system, for example in electric-motor brakes or electrohydraulic brakes.

In present-day vehicles, in particular those with antilock braking, drive slip, and/or vehicle dynamics control systems, it is known to sense the rotational speed of the wheels, i.e. the wheel rotation speeds, using sensors. By differentiating over time, it is in principle possible to determine the acceleration of the vehicle relative to the road surface, i.e. the ground acceleration. Problems occur in this context, however, if the wheels exhibit a certain slip (drive slip or braking slip). In addition. determining the ground acceleration solely from the wheel rotation speeds is not fast enough.

If a longitudinal acceleration sensor is present on or in the vehicle, it is fast in terms of sensing the vehicle acceleration, and substantially linear with respect to the instantaneously acting braking force. The longitudinal acceleration sensor has the disadvantage, however, that it associates the ground acceleration additionally with the slope drag. The sensor thus measures not only the desired ground acceleration $a\_\ddot{u}Gr$ but also acceleration components $g*\sin \alpha$ that are caused by a road surface inclined in the longitudinal direction (with slope $\alpha$):

$$a\_Sen = a\_\ddot{u}Gr + g*\sin \alpha$$

The object of the present invention is to make possible, in simple fashion, the ground acceleration.

SUMMARY OF THE INVENTION

As already mentioned, the present invention is based on a method and an apparatus for generating a driving status signal that represents the driving status of a motor vehicle. According to the present invention, a wheel acceleration variable representing the acceleration of the vehicle wheels is formed. In addition, an acceleration variable representing the longitudinal acceleration of the vehicle is sensed by way of sensors. A feature of the present invention is that the wheel acceleration variable that is formed is low-pass filtered, and the acceleration variable that is sensed is high-pass filtered; and the driving status signal is generated as a function of an association between the low-pass-filtered wheel acceleration variable and the high-pass-filtered acceleration variable.

The present invention makes it possible to determine the vehicle's ground acceleration from a combination of the signals of an acceleration sensor and the wheel rotation speed signals. The combination according to the present invention of the two signals is necessary in order to compensate for the disadvantages, mentioned above, of the individual sensors.

In particular, provision is made for the driving status signal to be generated as a function of an additive association of the low-pass-filtered wheel acceleration variable and the high-pass-filtered acceleration variable. Filtration followed by addition of the two filtered signals, according to the present invention, makes it possible to generate a signal that correctly indicates the ground acceleration.

In a particularly preferred embodiment of the present invention, provision is made for the low-pass filtration and high-pass filtration to be accomplished with the same time constants.

As already mentioned above, it is particularly advantageous to utilize the driving status signal, once generated, to regulate and/or control the vehicle's brakes and/or for spacing control and/or speed control purposes.

In particular, the driving status signal that is generated represents the acceleration of the vehicle relative to the road surface on which the vehicle is moving.

BRIEF DESCRIPTION OF THE DRAWING

The drawing shows an exemplary of the invention with reference to a block diagram.

DETAILED DESCRIPTION

An acceleration sensor 11 installed in the vehicle measures longitudinal acceleration $a\_Sen$ of the vehicle. The (wheel circumference) acceleration $a\_Rad$ of the vehicle wheels is calculated from the wheel rotation speed signals by differentiation over time (output signal of block 10). Signal $a\_Sen$ of acceleration sensor 11 is filtered in a high-pass filter 13 with time constant T, to yield high-pass-filtered signal $HP(a\_Sen)$.

Wheel acceleration signal $a\_Rad$, which is based on the wheel rotation speeds, is filtered using a low-pass filter 12 with the same time constant T, to yield low-pass-filtered signal $TP(a\_Rad)$.

The signals filtered in this fashion are added at node 14 to yield variable $a\_\ddot{u}Gr$, which represents the vehicle's acceleration relative to the road surface, i.e. the ground acceleration.

$$a\_\ddot{u}Gr = HP(a\_Sen) + TP(a\_Rad)$$

The result $a\_\ddot{u}Gr$ is a quick determination of the ground acceleration without the influence of the road surface inclination.

The information regarding road surface slope a, and regarding the acceleration or deceleration components $x = g*\sin \alpha$ caused by the road surface inclination, is present upstream from filters 12 and 13 and can be calculated, if necessary, by differentiation 15 and optionally by subsequent processing in block 16:

$$\alpha = \arc(\sin(x/g)).$$

What is claimed is:

1. A method for generating a driving status signal that represents a driving status of a motor vehicle, comprising the steps of:

forming a wheel acceleration variable representing an acceleration of vehicle wheels of the motor vehicle;

causing a plurality of sensors to sense an acceleration variable representing a longitudinal acceleration of the motor vehicle;

performing a low-pass filtering operation on the wheel acceleration variable;

performing a high-pass filtering operation on the acceleration variable representing the longitudinal acceleration of the motor vehicle; and generating the driving status signal as a function of an association between the low-pass-filtered wheel acceleration variable and the high-pass-filtered acceleration variable representing the longitudinal acceleration of the motor vehicle.

2. The method according to claim 1, wherein the generated driving status signal represents an acceleration of the motor vehicle relative to a road surface on which the motor vehicle is moving.

3. The method according to claim 1, wherein the low-pass filtering operation is performed in accordance with a time constant that is the same as a time constant according to which the high-pass filtering operation is performed.

4. The method according to claim 1, further comprising a performance of at least one of the steps of:

after the driving status signal is generated, performing at least one of a regulating operation and a controlling operation on brakes of the motor vehicle in accordance with the generated driving status signal;

after the driving status signal is generated, performing a spacing control operation in accordance with the generated driving status signal; and after the driving status signal is generated, performing a speed control operation in accordance with the generated driving status signal.

5. The method according to claim 1, wherein the driving status signal is generated as a function of an additive association of the low-pass-filtered wheel acceleration variable and the high-pass-filtered acceleration variable representing the longitudinal acceleration of the motor vehicle.

6. An apparatus for generating a driving status signal that represents a driving status of a motor vehicle, comprising:

an arrangement for forming a wheel acceleration variable representing an acceleration of vehicle wheels of the motor vehicle;

an arrangement including a plurality of sensors for sensing an acceleration variable representing a longitudinal acceleration of the motor vehicle;

an arrangement for performing a low-pass filtering operation on the wheel acceleration variable;

an arrangement for performing a high-pass filtering operation on the acceleration variable representing the longitudinal acceleration of the motor vehicle; and an arrangement for generating the driving status signal as a function of an association between the low-pass-filtered wheel acceleration variable and the high-pass-filtered acceleration variable representing the longitudinal acceleration of the motor vehicle.

7. The apparatus according to claim 6, wherein the low-pass filtering operation is performed in accordance with a time constant that is the same as a time constant according to which the high-pass filtering operation is performed.

8. The apparatus according to claim 6, wherein the generated driving status signal represents an acceleration of the motor vehicle relative to a road surface on which the motor vehicle is moving.

9. The apparatus according to claim 6, further comprising:

an arrangement for performing, after the driving status signal is generated, at least one of a regulating operation and a controlling operation on brakes of the motor vehicle in accordance with the generated driving status signal.

10. The apparatus according to claim 6, wherein the driving status signal is generated as a function of an additive association of the low-pass-filtered wheel acceleration variable and the high-pass-filtered acceleration variable representing the longitudinal acceleration of the motor vehicle.

* * * * *

UNITED STATES PATENT AND TRADEMARK OFFICE
CERTIFICATE OF CORRECTION

PATENT NO.   : 6,349,255 B1
DATED        : February 19, 2002
INVENTOR(S)  : Hans Heckmann et al.

It is certified that error appears in the above-identified patent and that said Letters Patent is hereby corrected as shown below:

Column 2,
Line 24, change "exemplary" to -- exemplary embodiment --.
Line 50, change "a," to -- $\alpha$, --.

Signed and Sealed this

Twenty-fifth Day of March, 2003

JAMES E. ROGAN
*Director of the United States Patent and Trademark Office*